United States Patent Office 3,801,479
Patented Apr. 2, 1974

3,801,479
METHOD OF MANUFACTURING SOLID ELECTROLYTIC CAPACITORS
Atsushi Nishino, Neyagawa, Hiroshi Kumano, Daito, and Hayashi Hayakawa, Hirakata, Japan, assignors to Matsushita Electric Industrial Co., Ltd., Osaka, Japan
Filed Mar. 7, 1972, Ser. No. 232,591
Claims priority, application Japan, Mar. 11, 1971, 46/13,822; Apr. 8, 1971, 46/22,206
Int. Cl. C23b 5/52, 9/02, 11/02
U.S. Cl. 204—37       7 Claims

ABSTRACT OF THE DISCLOSURE

A method of manufacturing solid electrolytic capacitors comprising the steps of forming a semiconductive dielectric film on the surface of a base body of such material as valve action metals, pyrolytically depositing a semiconductive metal oxide on the dielectric film, and uniformly electrodepositing a thin film of a semiconductive metal oxide by electrolytic oxidation from a bath of a metallic salt solution. The bath is heated such that the excited charge carriers in the semiconductive dielectric film and the pyrolytically deposited semiconductive metal oxide can be utilized for said electrolytic oxidation.

By this method solid electrolytic capacitors having improved characteristics are obtained.

---

This invention relates to improvements in and relating to the method of manufacturing solid electrolytic capacitors including a solid electrolyte.

The usual solid electrolytic capacitor has heretofore been manufactured by electrolytically oxidizing the surface of a porous body of a so-called valve action metal capable of being oxidized to form an anode film, for instance tantalum, titanium, niobium, zirconium, aluminum, hafnium and tungsten, thereby producing a porous electrode formed with a semiconductive dielectric film having the function of a rectifier, subsequently impregnating the porous electrode with a material capable of forming a semiconductor, followed by forming a solid electrolyte layer contiguous to the anode film by pyrolytically rendering the impregnated material into an oxide semiconductor layer, and finally coating the oxide semiconductor layer with a conductive material such as colloidal black lead.

By this method it is difficult to deposit manganese nitrate $Mn(NO_3)_2$ to a uniform thickness on a porous anode body. Also, since the deposited manganous nitrate is rapidly decomposed thermally at a high temperature of 200° C. to 400° C. at the time of the pyrolytic process, it is extremely difficult to obtain dense and uniform layer of pyrolytic manganese dioxide on the dielectric film of the porous electrode.

Therefore, it is necessary to repeat the four steps of immersing the porous body in a solution of manganese nitrate $Mn(NO_3)_2$, causing pyrolysis, washing with water and re-formation many times to complete a solid electrolytic capacitor.

Repeating the pyrolytic step many times, however, results in the generation of high temperature nitrogen oxide gas, deteriorating the dielectric film of the valve action metal both thermally and chemically, and the leakage current is increased in proportion to the number of pyrolytic steps involved. Further, with the pyrolytic process alone the manganese dioxide layer is formed not uniformly but locally, which leads to the short-circuiting between the anode and cathode after the application of the conducting material so that the capacitor function is lost. This problem is extremely significant in the manufacture of small size solid capacitors and thin film solid capacitors.

Furthermore, with a number of repeated pyrolytic steps the obtained manganese oxide layer has a low density and inferior conductivity and lacks in the the surface smoothness so that the formation or attachment of an electrode of such metal as gold, silver and aluminum is extremely difficult.

In addition to the above prior-art method, there have also been developed methods of electrochemically depositing manganese oxide material having the character of a semiconductor on the dielectric film. In one such method, the rectifying effect of the valve action metal is utilized to cause cathodic reduction of a permanganate solution so as to obtain the deposition of the manganese oxide material. In this method, manganese dioxide precipitated through the cathodic reduction of the permanganate is subsequently reduced to MnOOH, which is further reduced to $Mn^{2+}$. Therefore, this method is impracticable from the standpoint of extremely inferior bond to the metal oxide. The bond to the dielectric film is extremely inferior even if the cathodic reduction is stopped in the stage of the low grade oxide before reduction to $Mn^{2+}$. Also, since the electrodeposition is obtainable only superficially of the sintered first-forming body, the capacitance attainable, that is, the ratio between the capacitance ultimately formed and that formed in the first-forming, is extremely low.

There are further methods, namely one using an aqueous solution of a manganese salt to directly obtain the deposition on the dielectric film through electrolytic oxidation, and one in which the dielectric film and an electrolytic manganese dioxide layer are simultaneously formed through electrolytic oxidation. Either of these methods produce leakage current, so that it is difficult to obtain uniform deposition of the electrolytic manganese dioxide and form electrolytic manganese dioxide within the sintered body. Therefore, the capacitance attainable is low and a great loss results, so that these methods are also impractical.

An object of the invention is to solve the above various problems inherent in the formation of the semiconductive oxide material in the prior-art manufacture of solid electrolytic capacitors.

The invention is based on extensive investigations of semiconductive properties of solid electrolytic capacitors, pyrolytical properties of thermally decomposable metallic salts including manganese salts and electromotive force and other characteristics of metal oxides. According to the invention, there is provided a method of manufacturing solid electrolytic capacitors, in which the pyrolysis of manganese salt, electrolytic oxidation of manganese salt, thermal treatment of capacitor body and high-temperature electrochemical treatment of the capacitor body are incorporated in a suitable way, and which has novel and excellent features.

The term "high-temperature-forming" in this specification is intended to mean a reforming of a material in a high-temperature atmosphere with application of an external power supply thereto. While the term "heat treatment" means a treatment of a material in a high-temperature atmosphere without applying an external power supply thereto.

The present invention will now be described with reference to the accompanying drawings showing preferred embodiments of the invention, in which.

Figure 1:
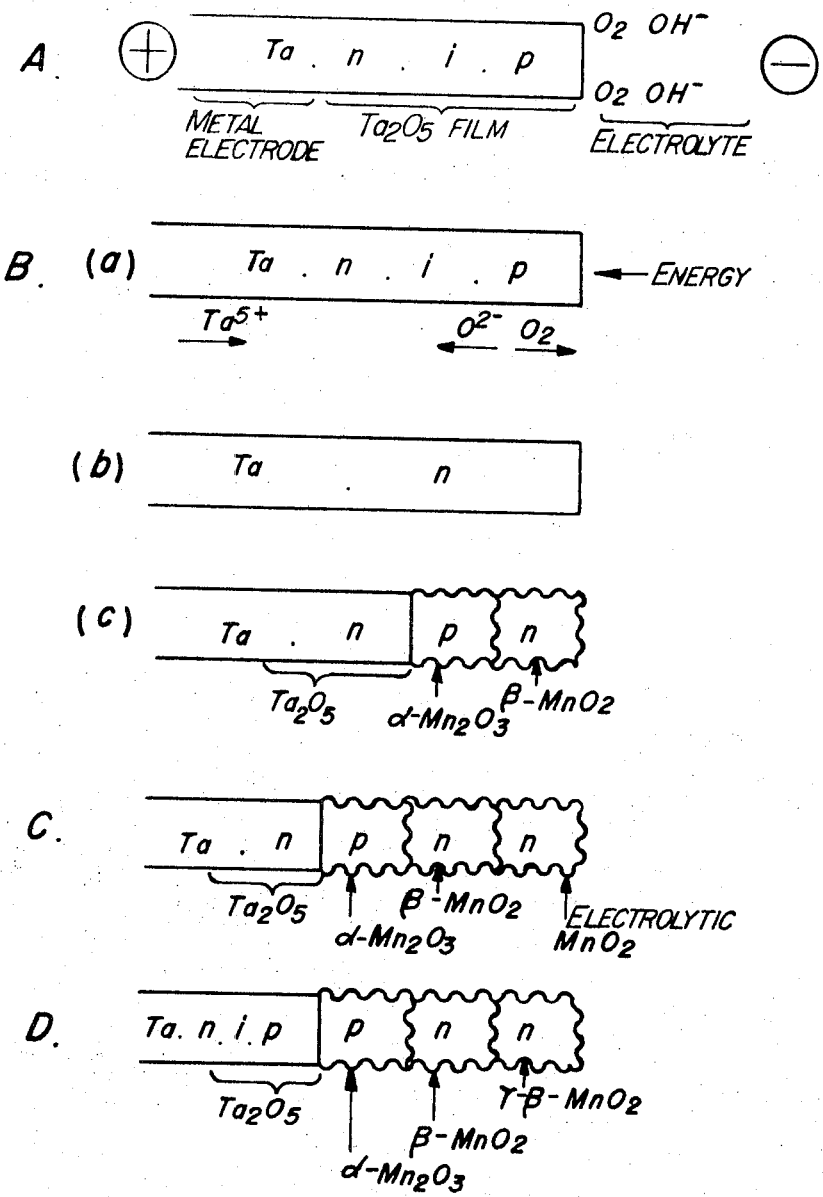
FIG. 1 is a pictorial representation of successive states of an eventual tantalum solid electrolytic capacitor in respective step of the manufacture thereof embodying the invention.

FIG. 1 pictorially shows successive states of an eventual tantalum solid electrolytic capacitor in respective steps of the manufacture thereof. In the figure, reference symbol p represents p-type semiconductor, symbol n n-type semiconductor, and symbol i inversion layer.

In the illustrated embodiment of the method according to the invention, tantalum is used as the valve action metal, an aqueous solution of $Mn(NO_3)_2$ as the medium for creating a semiconductor, and aqueous solution of manganese nitrate as the electrolyte for electrolytic oxidation.

The electrolytic oxidation is caused to proceed by using a liquid capable of forming a dielectric film, for instance citric acid, to form a dielectric film having a n-i-p structure exhibiting rectifying function, as shown at A in FIG. 1.

Then, the system is subjected to a pyrolytic process using the aqueous solution of $Mn(NO_3)_2$. When the temperature of the dielectric film is elevated to a pyrolysis temperature, for instance 200° C. to 500° C., $Ta^{5+}$ ions acquiring kinetic energy from the metal electrode side begin to diffuse toward the surface of the oxide film, as shown at B(a) in FIG. 1. $Ta^{5+}$ ions migrating through the oxide film react with oxygen ions in the p-type region of the $Ta_2O_5$ film to produce additional $Ta_2O_5$. With $Ta^{5+}$ ions being successively diffused from the metal side, the entire oxide film is rendered into n-type $Ta_2O_5$ which is a metal excess type semiconductor, as shown at B(b) in FIG. 1. Meanwhile, a manganese oxide layer is formed on the dielectric film as a result of the pyrolysis of the manganese nitrate solution. At this time, the pyrolytically deposited manganese dioxide partly undergoes reaction with $Ta^{5+}$ ions diffused from the metal electrode side and is thus reduced. Thus, a thin $\alpha\text{-}Mn_2O_3$ region is formed adjacent to the $Ta_2O_5$ film as shown at B(c) in FIG. 1. This $\alpha\text{-}Mn_2O_3$ region has the character of p-type semiconductor. The rest of the manganese dioxide slightly distant from the dielectric film forms a stable $\beta\text{-}MnO_2$ region which is an n-type semiconductor, as also shown at B(c) in FIG. 1.

With the above pyrolytic process alone, however, it is difficult to obtain uniform deposition of the manganese oxide material on the dielectric film surface, as is mentioned earlier. Repeatedly carrying out the impregnation and pyrolysis step over and again in order to obtain uniform deposition of oxide material on dielectric film as in the prior art would, however, result in extreme deterioration of the dielectric film.

In accordance with the invention after pyrolytically depositing an extremely thin manganese oxide film on the surface of the sintered tantalum body as shown at B(c) in FIG. 1, a theoretically required quantity of additional electrolytic manganese dioxide such as $\gamma\text{-}MnO_2$ or hydrated amorphous manganese dioxide is electrolytically deposited thinly and uniformly on the pyrolytic manganese oxide material through anodic oxidation using an aqueous solution of manganese salt, as shown at C in FIG. 1. What is important at this time is the anodic oxidation current. For the anodic oxidation current excited charge carriers in the compound semiconductor are utilized. The n-type $Ta_2O_5$, p-type $Ta_2O_5$, $\alpha\text{-}Mn_2O_3$ and $\beta\text{-}MnO_2$ provide respective different Fermi energy levels. While $Ta_2O_5$ presents a large energy gap at normal temperature, at a suitably elevated temperature charge carriers are readily made available in it to cause enough current for the anodic oxidation of manganese dioxide without the dielectric film being punctured. Thus, it is possible to cause anodic oxidation in the manganese salt solution so as to obtain uniform deposition of electrolytic manganese dioxide without causing the breakdown of the dielectric film, as shown at C in FIG. 1. However, if a current surpassing the excited charge carriers is caused, the dielectric film will breakdown and uniform deposition cannot be obtained. With leakage current $\gamma\text{-}MnO_2$ may be deposited only locally. Also, without any pyrolytically deposited manganese oxide material no charge carrier may be obtained and it will be solely leakage current that is available.

Although the system shown at C in FIG. 1 has a sufficient quantity of the deposited manganese oxide material required to the solid electrolytic capacitor, its structure is still insufficient for the capacitor, and it is accordingly subjected to a heat treatment or a high-temperature-forming which is a characteristic feature of the invention. In the high-temperature-forming a crystal transformation and a degassing are effected.

In order to facilitate the full understanding of the concrete method according to the invention, electrochemical reaction mechanisms involved in the solid electrolytic capacitor will now be discussed.

Figure 2:
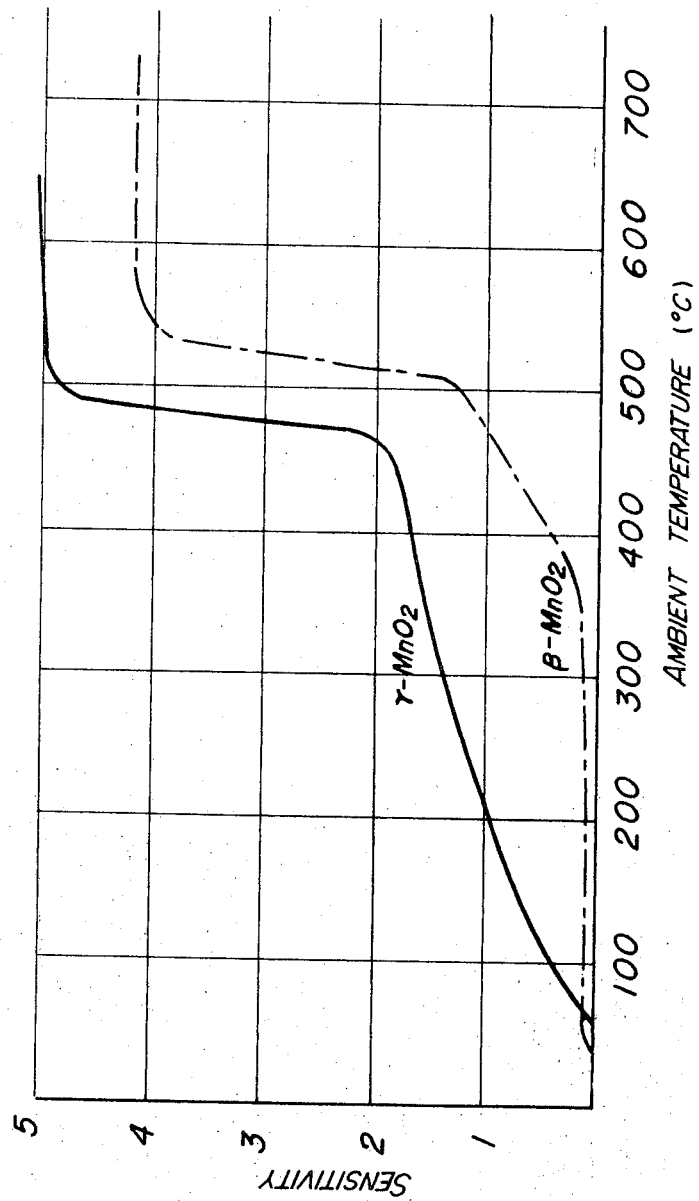
FIG. 2 is a graph illustrating thermal balance results.

FIG. 2 shows thermal-balance results for pyrolytically obtained $\beta\text{-}MnO_2$ and electrolytically obtained $\gamma\text{-}MnO_2$. It will be appreciated that $\gamma\text{-}MnO_2$ will contain considerable quantities of combined water and moisture water contents and free effective oxygen at temperatures below 400° C. Also, it will be seen that as to the capacity of the manganese oxides to furnish oxygen,

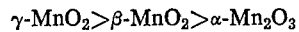

$$\gamma\text{-}MnO_2 > \beta\text{-}MnO_2 > \alpha\text{-}Mn_2O_3$$

Figure 3:
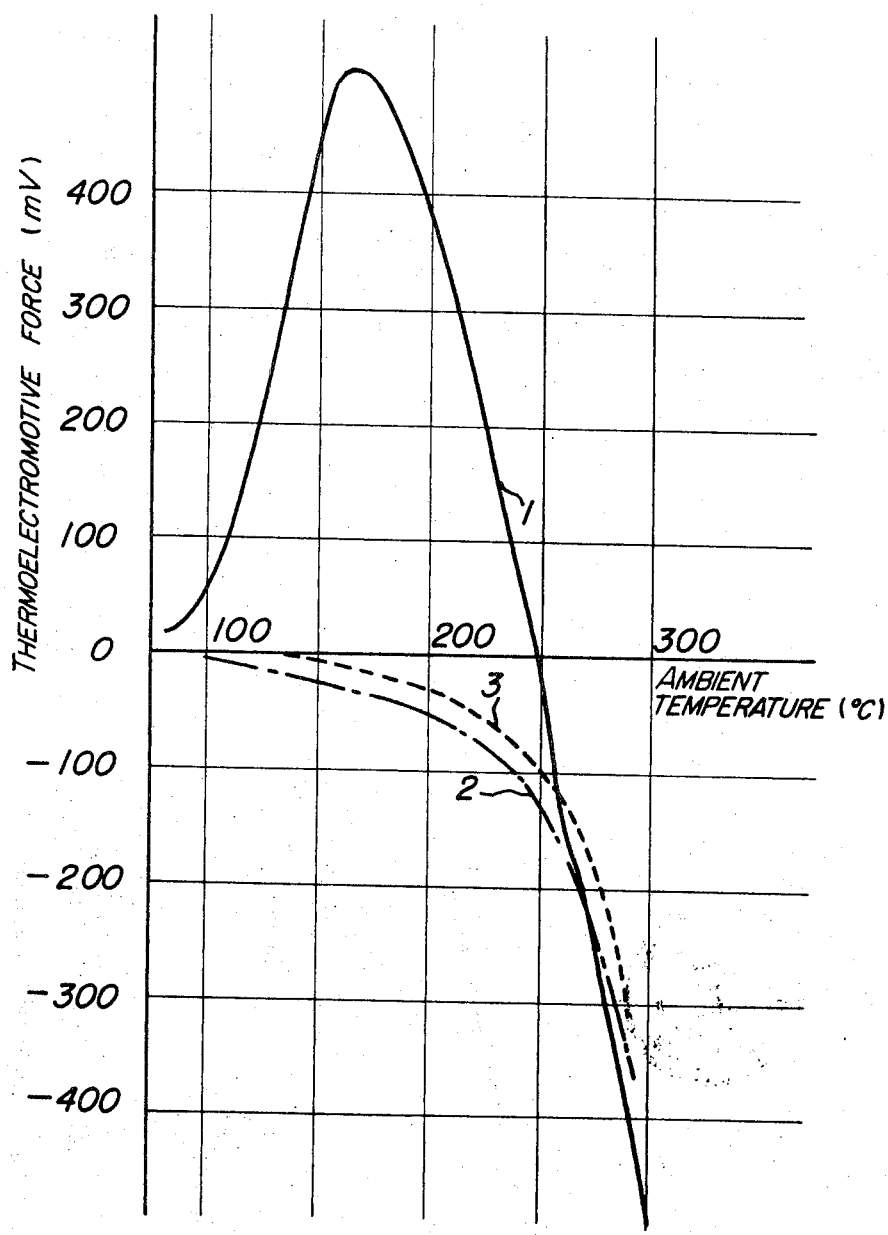
FIG. 3 is a graph showing electromotive force characteristics.

FIG. 3 shows the relation between electromotive force and ambient temperature for certain solid electrolytic capacitors manufactured from a single 100-mg. tantalum sintered body. Curve 1 represents the electromotive force for a capacitor having the structure shown at C in FIG. 1, with the electrolytic manganese dioxide deposited through the combined pyrolysis-electrolysis method. In this capacitor the polarity is reversed for temperatures above 250° C. Curve 2 shows the electromotive force for a capacitor obtained by subjecting the capacitor of the curve 1 to a heat treatment at a temperature of 300° C. for 30 minutes. Curve 3 shows the electromotive force for a capacitor fabricated by the conventional sole pyrolysis method.

Figure 4:
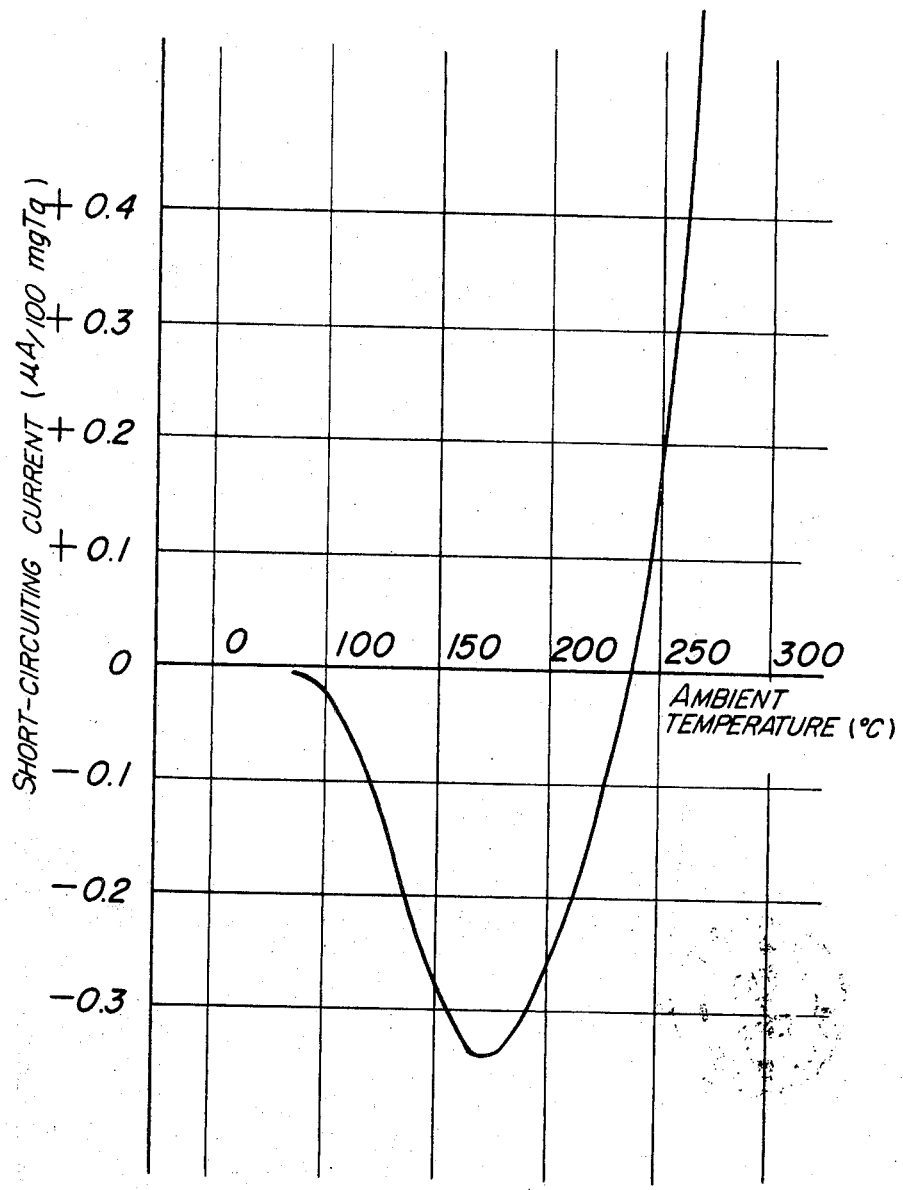
FIG. 4 is a graph showing a short-circuiting current versus temperature characteristic.

FIG. 4 shows a short-circuiting current versus ambient temperature characteristic of a capacitor having a structure as shown at C in FIG. 1, with the electrolytic manganese dioxide deposited through the combined pyrolysis-electrolysis method.

Figure 5:
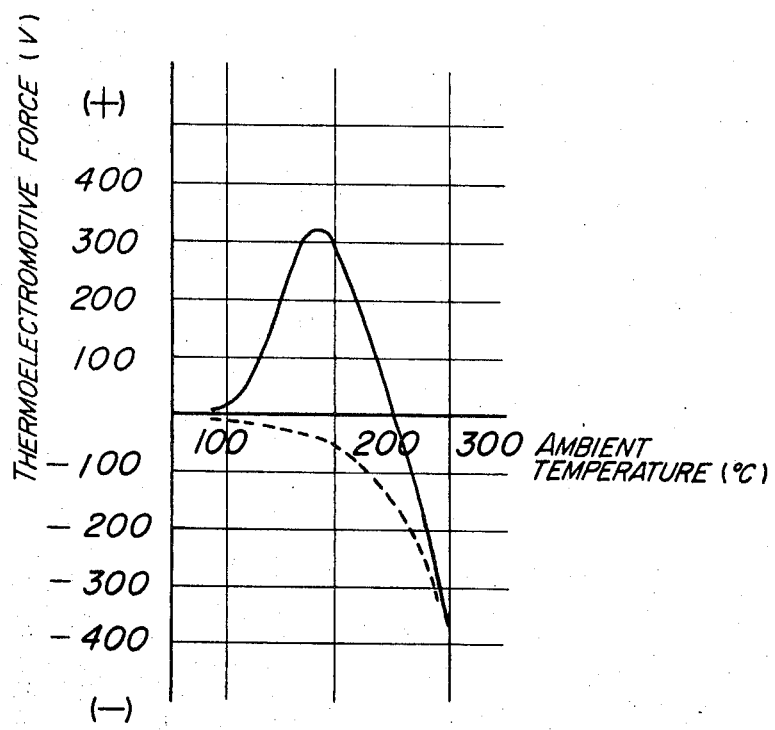
FIG. 5 is a graph showing electromotive force characteristics.

FIG. 5 shows the electromotive force based on the tantalum electrodes of certain capacitor structures plotted against ambient temperature. The dashed curve obtains through the sole pyrolysis method. In this case the polarity of the tantalum electrode is negative for all temperatures. The solid curve obtains through the combined pyrolysis-electrolysis method. In this case, the electromotive force on the tantalum electrode is positive for temperatures up to 250° C., but for higher temperatures it is negative like the case of the sole pyrolysis method. In this connection, the following is presumable:

(I) When the tantalum electrode polarity is negative, the electrochemical system is $$(-)Ta/Ta_2O_5/Mn_2O_3\cdot MnO_2/metal(+)$$

and the electrochemical reaction mechanisms involved are $$Ta \rightarrow Ta^{5+} + 5e^{1-} \qquad (1)$$

$$10MnO_2 + 10e^{1-} \rightarrow 5Mn_2O_3 + \tfrac{5}{2}O_2 \qquad (2)$$

$$2Ta^{5+} + 5O_2 \rightarrow Ta_2O_5 \qquad (3)$$

(II) When the tantalum electrode polarity is positive, the electrochemical system is $$(-)\gamma\text{-}MnO_2/\beta\text{-}MnO_2\cdot\alpha\text{-}Mn_2O_3/Ta_2O_5/Ta(+)$$

At temperatures below 250° C., $\gamma$-MnO$_2$ contains combined water and may also be expressed as MnO$_2$·H$_2$O. Considering the combined water, the electrochemical reaction mechanisms involved are then $$H_2O \rightarrow H^{1+} + OH^{1-} \quad (4)$$

$$2MnO_2 + 2H^{1+} + 2e^{1-} = 2(MnOOH) = Mn_2O_3\cdot H_2O$$
$$= \alpha\text{-}Mn_2O_3\cdot XH_2O \rightleftharpoons \alpha\text{-}Mn_2O_3 \quad (5)$$

$$2OH^{1-} = H_2O + \tfrac{1}{2}O_2 + 2e^{1-} \quad (6)$$

$$2Ta^{5+} + 5O_2 + 10e^{1-} \rightarrow Ta_2O_5 \quad (7)$$

$$Mn_2O_3 + \tfrac{1}{2}O_2 \rightarrow 2MnO_2 \quad (8)$$

Though there are some points to be studied further, the above reaction Formulae 1 to 7 are well presumable on the basis of FIGS. 2 to 5.

Figure 6:
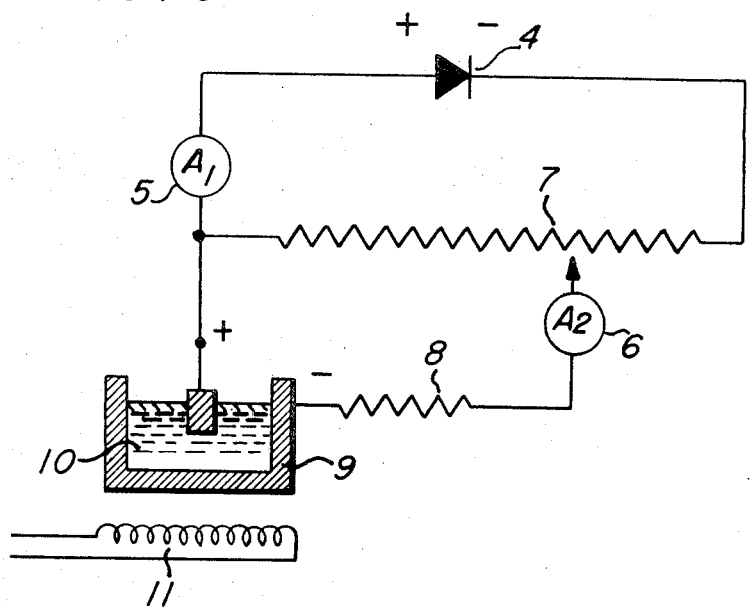
FIG. 6 is a schematic representation of an arrangement for the high-temperature-forming.

It is to be noted that when the tantalum electrode polarity is negative Ta$_2$O$_5$ acts as n-type semiconductor, while when the tantalum electrode polarity is positive Ta$_2$O$_5$ acts as p-type semiconductor. In this aspect, in accordance with the invention the system having the structure of FIG. 1C, with the electrolytic manganese dioxide deposited through the combined pyrolysis-electrolysis method, is subjected to a heat treatment in a high-temperature atmosphere at a temperature of 110° C. or above, or a high-temperature-forming using a set-up as shown in FIG. 6, with an external power supply adjusted such that the tantalum electrode is held at zero or a positive potential in an atmosphere at a temperature between 110° C. and 500° C., thereby obtaining a semiconductor structure as shown at D in FIG. 1. In this manner, a solid electrolytic capacitor having heretofore unattainable excellent performance may be obtained.

In FIG. 6, numeral 4 designates a source rectifier, numerals 5 and 6 ammeters, numeral 7 a variable resistor, numeral 8 a resistor, numeral 9 an electric furnace, numeral 10 a low-melting solder, and numeral 11 an automatic temperature control means.

The solid electrolytic capacitor obtained by the method according to the invention is very stable and substantially free from flicker. Also, leakage current is very little. Further, the working voltage level may be increased compared to the prior-art capacitor. Furthermore, the electrodeposited metal oxide semiconductor layer obtained in accordance with the invention is more uniform, has superior adhesive character and is far thinner compared to that obtainable through the sole pyrolysis method, and nevertheless it is highly capable of furnishing the dielectric film with oxygen and has superior self-heating character to the layer obtainable through the sole pyrolysis method so that extremely little flicker results.

While the above embodiment is concerned with sintered tantalum body and manganese oxide material, the effects of the invention may as well be obtained where the valve action metals other than tantalum are used and where other pyrolytic metal oxides than the manganese oxide, for instance oxides of lead, nickel, chromium, are used.

Figure 7:
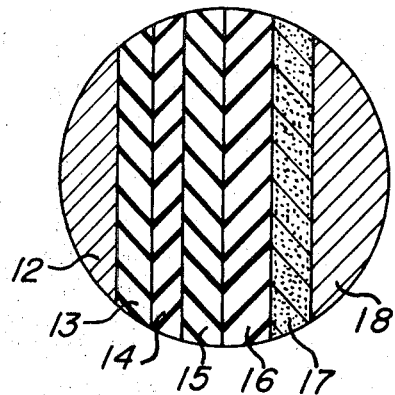
FIG. 7 is a fragmentary sectional view, to an enlarged scale, showing a solid electrolytic capacitor obtained in accordance with the invention.

FIG. 7 shows the structure of a capacitor obtained in accordance with the invention. Numeral 12 designates a valve action metal such as tantalum capable of being formed with superficial oxide film, numeral 13 an oxide layer of the valve action metal 12, numeral 14 a pyrolytically formed low grade metal oxide layer (such as $\alpha$-Mn$_2$O$_3$ described above) numeral 15 a pyrolytically formed metal oxide material (for instance, $\beta$-MnO$_2$) and numeral 16 designates the electrolytically deposited material. In the above embodiment, $\gamma$-MnO$_2$ is first electrolytically deposited and which is then modified into $\gamma$-$\beta$-MnO$_2$ by a high-temperature-forming. Numeral 17 designates colloidal graphite, and numeral 18 conductive coating such as silver paste coating. Insulated anode and cathode leads are respectively connected to valve action metal 12 and conductive coating 18 to complete a capacitor.

The major requirements for the method according to the invention may be summarized as follows:

(1) Base material of the capacitor body: Such valve action metals as titanium, aluminum, tungsten, hafnium and alloys of these metals and also silicon and germanium are covered.

(2) Medium for formation of the dielectric film: Aqueous solution of such acids as acetic acid, citric acid, succinic acid and phorphoric acid, and fused salt are covered.

(3) Solution medium for the pyrolytic process: Metallic salts capable of forming semiconductive metal oxides, for example manganese nitrate, manganese acetate, lead nitrate and nickel nitrate are covered.

(4) Temperature for pyrolysis: 200° C. to 500° C.

(5) Required number of pyrolytic steps: 1 to 8.

(6) Electrolyte for electrolytically depositing metal oxide material: MnSO$_4$, Mn(NO$_3$)$_2$, Mn(CH$_3$COO)$_2$, Pb(SO$_4$), Pb(NO$_3$)$_2$, and Pb(CH$_3$COO)$_2$ are covered.

(7) Concentration of the electrolyte (for the deposition of the metal oxide material): 0.2 to 2.0 mol/l.

(8) Electric bath temperature: 50° C. to 99° C.

(9) Anode current density for electrolytic deposition: 0.005 $\mu$a./mg. $<D_A<$1.0 ma./mg. or 0.001 $\mu$a./cm.$^2$ $<D_A<$400 $\mu$a./cm.$^2$.

(10) Quantity of material electrolytically deposited: It differs according to the shape, grain size and porosity of the body.

(11) High-temperature-forming: The high-temperature-forming is done by using external power supply and holding the capacitor body at a slightly positive potential under a temperature condition of 110° C. to 500° C.

Additional considerations of the above requirements are given in the following:

(1) The capacitor body which is an ordinary valve action metal or an alloy thereof, may be in the form of a plate, thin film, sintered body or tip.

(2) The dielectric film may be formed through oxidation by using an ordinary oxidizing bath such as citric acid bath, ammonium phosphate bath and a bath of a fused salt.

(3) While manganese nitrate solution is most economical, it can be easily handled and is well known as the pyrolytic solution, acetates and nitrates of nickel, lead, etc. may be used as well.

(4) While the pyrolysis temperature is usually 200° C. to 450° C., it may be 250° C. to 550° C. depending upon other conditions.

(5) The number of pyrolytic processes is determined by the shape, size, sintering conditions and grain size of the capacitor body. In accordance with the invention, the required number of pyrolytic steps need be only one-half to one-fourth of that required in the prior-art sole pyrolysis method. In case of a small-size body, only a single pyrolytic step is sufficient. It is not always necessary to carry out reforming step after the pyrolytic process with few pyrolytic steps with which the thermal deterioration is not serious. If the thermal deterioration is serious, however, the reforming step may be preferably done.

(6) Concentration of the electrolyte for depositing manganese dioxide is suitably about 0.2 to 2.0 mol/l., but with a concentration below 0.01 mol/l. no substantial undesired effect and satisfactory electrolytic deposition may be obtained.

In case of other electrolyte than that containing manganese, for example a salt of lead or nickel, a slightly higher pyrolysis temperature is preferable. In case of electrolytic oxidation the same consideration as for manganese salt applies.

(7) As has been described in connection with FIG. 1, the temperature of the electrolytic bath should be such that at that temperature charge carriers required for electrolytic oxidation to be obtained in the electrolytic bath are available in the valve action metal oxide and the pyrolytic metal oxide deposited thereon. Essentially, the electrolytic oxidation is effected with the excited current at the bath temperature. Although a slightly higher current may sometimes be used depending upon other conditions, the less the leakage current the superior are the capacitor characteristics obtainable. However, utilization of leakage current is usually undesirable, since with leakage current the electrolytic metal oxide is difficultly formed within the sintered body. Also, with leakage current uniform electrolytic deposition is difficult to obtain. The bath temperature is preferably 50° C. to 99° C. although it differs depending upon the material, shape and porosity of the base element, formation voltage, pyrolytic process conditions and so forth. Although the bath temperature may be lower than 50° C., in such case the current density should be extremely reduced. On the other hand, at temperatures above 99° C. the solution usually boils, so that a temperature lower than 99° C. but as high as possible is desirous from the standpoint of handling and economy.

(8) The current density for electrolytic oxidation differs depending upon whether the base element is a sintered body or a plate. It also differs depending upon sintering conditions and grain size in case of the sintered body, kind of valve action metal, electrolytic bath temperature, pyrolysis temperature and so forth. In case of tantalum sintered body, the anode current density with which to obtain uniform and dense electrolytic precipitation in the form of a thin film of high quality, excellently self-heating metal oxide material on the pyrolytically formed metal oxide material without causing the puncture of the dielectric film is $$0.005 \ \mu a./mg. < D_A < 1.0 \ ma./mg.$$

or $$0.001 \ \mu a./cm.^2 < D_A < 400 \ \mu a./cm.^2$$

(9) While the quantity of deposited material differs depending upon the shape and size of the base element and withstand voltage of the dielectric, a suitable deposition time is 30 minutes to 10 hours. This range however is not limitative since the quantity of the deposited metal oxide material is proportional to the quantity of electric charge supplied.

(10) The high-temperature-forming is one of the important features of the invention. As is mentioned earlier, the tantalum electrode obtained through the combined pyrolytic and electrolytic deposition method provides electromotive force, and its polarity is positive at temperatures above 100° C. and below 250° C. and negative at temperatures higher than 250° C. Principally, the high-temperature-forming is done with the set-up as shown in FIG. 6 and by adjusting the external power supply so that the tantalum electrode (valve action metal electrode) may always be at zero or slightly positive potential. In this manner, it is possible to obtain a capacitor having a more uniform structure and with less leakage current. This is because through the high-temperature-forming the effective oxygen in $\gamma$-MnO$_2$ is effectively diffused toward the interface thereof with Ta$_2$O$_5$, whereby a more ideal n-i-p structure in Ta$_2$O$_5$ results.

It is possible to obtain a capacitor having fairly superior performance compared to the performance obtainable by the prior-art method with a heat treatment at a temperature above 110° C. without using any external power supply. However, high-temperature-forming using external power source permits fabricating solid electrolytic capacitors more precisely conforming to standards in a shorter time. The controlled temperature and current in this step are determined according to the conditions for producing the base element.

A concrete example is given in the following:

EXAMPLE

Electrolytic oxidation was caused to proceed in a 0.05-percent citric acid solution at room temperature for 2 hours to form a 30-volt dielectric film on a certain number of tantalum sintered bodies each 100 milligrams in weight. Some of the samples thus obtained were then subjected to the conventional pyrolytic process using a 60-percent Mn(NO$_3$)$_2$, solution 14 times. Other samples were subjected to the same pyrolytic process 1 to 5 times, followed by an electrolytic oxidation step in a 0.9-mol/l. Mn(NO$_3$)$_2$ solution as electrolyte with an anode current density of 150 $\mu$a./one body (=60 cm.$^2$/one body) with respect to the area of the samples and at a temperature of 90° C. for 5 hours. Thereafter, some of the invention samples were subjected to a heat treatment at a temperature of 200° C. for 30 hours, while other, invention samples were subjected to a high-temperature-forming using external power source at temperatures of 250° C., 300° C. and 350° C. respectively. Results of measurements made on the resultant samples are listed in the table below.

|  | Prior art | Methods according to the invention | | | | | |
|---|---|---|---|---|---|---|---|
|  |  | No. 1 | No. 2 | No. 3 | No. 4 | No. 5 | No 6 |
| Number of pyrolytic steps with Mn(NO$_3$)$_2$ | 14 | 1 | 3 | 5 | 3 | 3 | 3 |
| Period of electrolytic step with Mn(NO$_3$)$_2$ in hours |  | 5 | 5 | 5 | 5 | 5 | 5 |
| Temperature of heat treatment (without power supply) in degrees centigrade |  | 200 | 200 | 200 |  |  |  |
| Period of heat treatment (without power supply) in min |  | 30 | 30 | 30 |  |  |  |
| Temperature of high-temperature-forming (with power supply) in degrees centigrade |  |  |  |  | 350 | 300 | 250 |
| Period of high-temperature-forming (with power supply) in min |  |  |  |  | 5 | 7 | 15 |
| Leakage current at 20 v. in $\mu$a | 1.5 | 0.2 | 0.1 | 0.09 | 0.05 | 0.04 | 0.05 |
| Capacitance in $\mu$f | 15.3 | 14.8 | 14.5 | 15.5 | 15.2 | 15.3 | 15.4 |
| Tan $\delta$ (CR) | 25 | 18 | 21 | 16 | 17 | 16 | 17 |

What is claimed is:

1. A method of manufacturing a solid electrolytic capacitor, which comprises the steps of:
   forming a semiconductive dielectric film on the surface of a body of a material selected from a group consisting of
      valve action metal selected from the group consisting of tantalum, aluminum, titanium, zirconium and hafnium,
      alloys of these metals, and
      semiconductive materials selected from the group consisting of silicon and germanium,
   by anodizing said surface,
   pyrolytically depositing a metal oxide having a character of a semiconductor on said semiconductive dielectric film through the pyrolysis of a solution containing a metallic salt which can be subjected to pyrolysis,
   uniformly electrodepositing a thin film of a semi-conductive metal oxide selected from the group consisting of oxides of nickel, lead and manganese on said pyrolytically deposited semiconductive metal oxide conducted in a bath containing the metallic salt solution held at a temperature at which excited charge carriers in said semiconductive dielectric film and said pyrolytically deposited semiconductive metal oxide serves as a current carrier for said electroplating, and
   heating the article at a temperature of 110° C. or above.

2. The method of manufacturing a solid electrolytic capacitor according to claim 1, wherein the current density $D_A$ due to said excited charge carriers is in a range given as $$0.005 \ \mu a./mg. < D_A < 1.0 \ ma./mg.$$

or $$0.001 \ \mu a./cm.^2 < D_A < 400 \ \mu a./cm.^2$$

3. The method of manufacturing a solid electrolytic capacitor according to claim 1, wherein during the final heating step the capacitor is immersed in a molten low-melting bath in an electric furnace and provided with an automatic temperature control means and a rectified power source is connected between said capacitor immersed in said low-melting conductor and said electric furnace, said power source being adjusted such that said capacitor as an anode is held at zero or slightly positive potential.

4. A method of manufacturing a solid electrolytic capacitor according to claim 1, wherein said semiconductive dielectric film is formed on the surface of said body by oxidizing said body in an aqueous solution of acetic acid, citric acid, succinic acid, phosphoric acid and ammonium phosphate or a fused salt bath.

5. A method of manufacturing a solid electrolytic capacitor according to claim 1, wherein the metal oxide is pyrolytically deposited at a temperature of 200–550° C.

6. A method of manufacturing a solid electrolytic capacitor according to claim 1, wherein the metallic salt contained in the pyrolysis solution is selected from the group consisting of manganese nitrate, manganese acetate, lead nitrate and nickel nitrate.

7. A method of manufacturing a solid electrolytic capacitor according to claim 1, wherein the bath temperature during the anodic oxidation is between 50° C. and 99° C.

References Cited
UNITED STATES PATENTS

| | | | |
|---|---|---|---|
| 3,535,217 | 10/1970 | Amano et al. | 204—57 |
| 3,568,306 | 3/1971 | Yamashita | 204—38 B |
| 3,531,383 | 9/1970 | Lochman et al. | 204—56 R |

JOHN H. MACK, Primary Examiner

R. L. ANDREWS, Assistant Examiner

U.S. Cl. X.R.

204—38 A, 56 R, 57, 58